UNITED STATES PATENT OFFICE.

CARL OSCAR MÜLLER, OF BASLE, SWITZERLAND, ASSIGNOR TO BASLE CHEMICAL WORKS BINDSCHEDLER, OF SAME PLACE.

RHODAMIN DYE.

SPECIFICATION forming part of Letters Patent No. 584,119, dated June 8, 1897.

Application filed March 13, 1897. Serial No. 627,378. (Specimens.) Patented in France March 6, 1895, No. 245,593, and in England March 8, 1895, No. 4,985.

*To all whom it may concern:*

Be it known that I, CARL OSCAR MÜLLER, chemist, a subject of the Emperor of Germany, residing at Basle, Switzerland, have invented certain Improvements in the Manufacture of Rhodamin Dyes, (which have been patented in France by Letters Patent No. 245,593, dated March 6, 1895, and in England by Letters Patent No. 4,985, dated March 8, 1895,) of which the following is a clear and complete specification.

As described in the Patent No. 578,578, dated March 9, 1897, I obtain by condensation of the dimethylamidoöxybenzoyl-benzoic acid, invented by me, with metaämidoparacresol ($CH_3:NH_2:OH = 1:2:4$) a new rhodamin which could not be produced by any process known hitherto.

The base of this new rhodamin probably has the following constitutional formula:

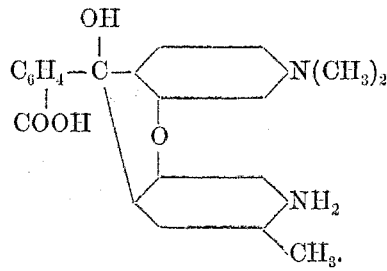

It has now further been found that by means of etherifying agents this rhodamin can easily be converted into alkyl ethers, being valuable red-coloring matters, dyeing cotton, wool, and silk.

Example: Thirty kilos of the unsymmetrical rhodamin from dimethylamidoöxybenzoyl-benzoic acid and metaämidoparacresol are dissolved in eighty kilos alcohol and forty-five kilos concentrated sulfuric acid monohydrate and heated during eight hours. Then the substance is poured into water and precipitated by salt. The coloring-matter is dissolved, filtered; and strongly acidulated with concentrated hydrochloric acid. The crystals which then separate are purified by recrystallization.

The coloring-matter in the form of its hydrochloric salt is in fine green crystals, which are soluble in water and alcohol with a fine red tint. The base is soluble in alcohol and water. In concentrated sulfuric acid the product is soluble with a yellow tint, which turns into red on addition of water. The dyestuff probably has the following constitutional formula

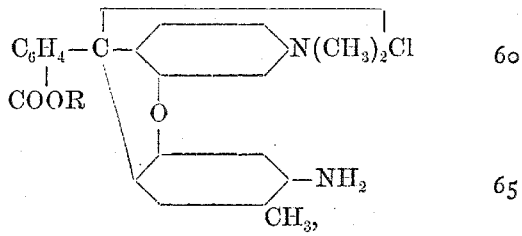

where R stands for an alkyl group or an alkyl rest.

What I claim as my invention, and wish to secure by Letters Patent, is—

As a new article of manufacture the herein-described alkyl ether of the unsymmetrical dimethyl-methylrhodamin derived from dimethylamidoöxybenzoyl-benzoic acid and metaämidoparacresol, which constitutes, in the form of its hydrochloric salt, fine green crystals, which are soluble in water and alcohol with a fine red tint, dissolve in concentrated sulfuric acid with a yellow tint which turns to red on addition of water, and dye cotton, silk and wool in red tints.

In witness whereof I have hereunto signed my name in the presence of two subscribing witnesses.

CARL OSCAR MÜLLER.

Witnesses:
 GEORGE GIFFORD,
 AMAND RITTER.